United States Patent [19]

Micheau et al.

[11] Patent Number: 5,247,961
[45] Date of Patent: Sep. 28, 1993

[54] ARTICULATED SUPPORT FOR FLEXIBLE SUPPLY PIPES

[75] Inventors: Philippe Micheau, Fontaines Saint-Martin; Philippe Petit, Lyons; Bernard Thelier, Bellerive-sur-Allier, all of France

[73] Assignee: Distributions Etudes, Creations Realisation Industrielles Lyonnaises Decril, Miribel, France

[21] Appl. No.: 904,305

[22] Filed: Jun. 25, 1992

[30] Foreign Application Priority Data

Jun. 26, 1991 [FR] France ................ 91 08181

[51] Int. Cl.⁵ .................................. B65H 75/36
[52] U.S. Cl. .................. 137/355.16; 248/49
[58] Field of Search ............ 248/49; 137/355.16

[56] References Cited

U.S. PATENT DOCUMENTS

| | | | |
|---|---|---|---|
| 3,098,349 | 7/1963 | Waninger | 248/49 |
| 3,157,376 | 11/1964 | Merker et al. | 248/49 |
| 4,104,871 | 8/1978 | Moritz | 248/49 |
| 4,590,961 | 5/1986 | Schuman | 137/355.16 |
| 5,048,283 | 9/1991 | Moritz et al. | 248/49 |

Primary Examiner—A. Michael Chambers
Attorney, Agent, or Firm—Dowell & Dowell

[57] ABSTRACT

An articulated chain for supporting flexible conduits which includes links having a forked end defined by parallel flanges and a tenon end of a configuration to be received in the forked end of an adjacent link. The links are pivotally controlled by plates having at least one arcuate boss which non-pivotally engages within a slot made in one of the flanges of one of the links and from which extends a rib which is loosely fitted within a slot made in the tenon end of an adjacent link. Protrusions extend from the plates for locking the plates to the other flange of the forked end of the link to which the adjacent tenon is connected.

4 Claims, 2 Drawing Sheets

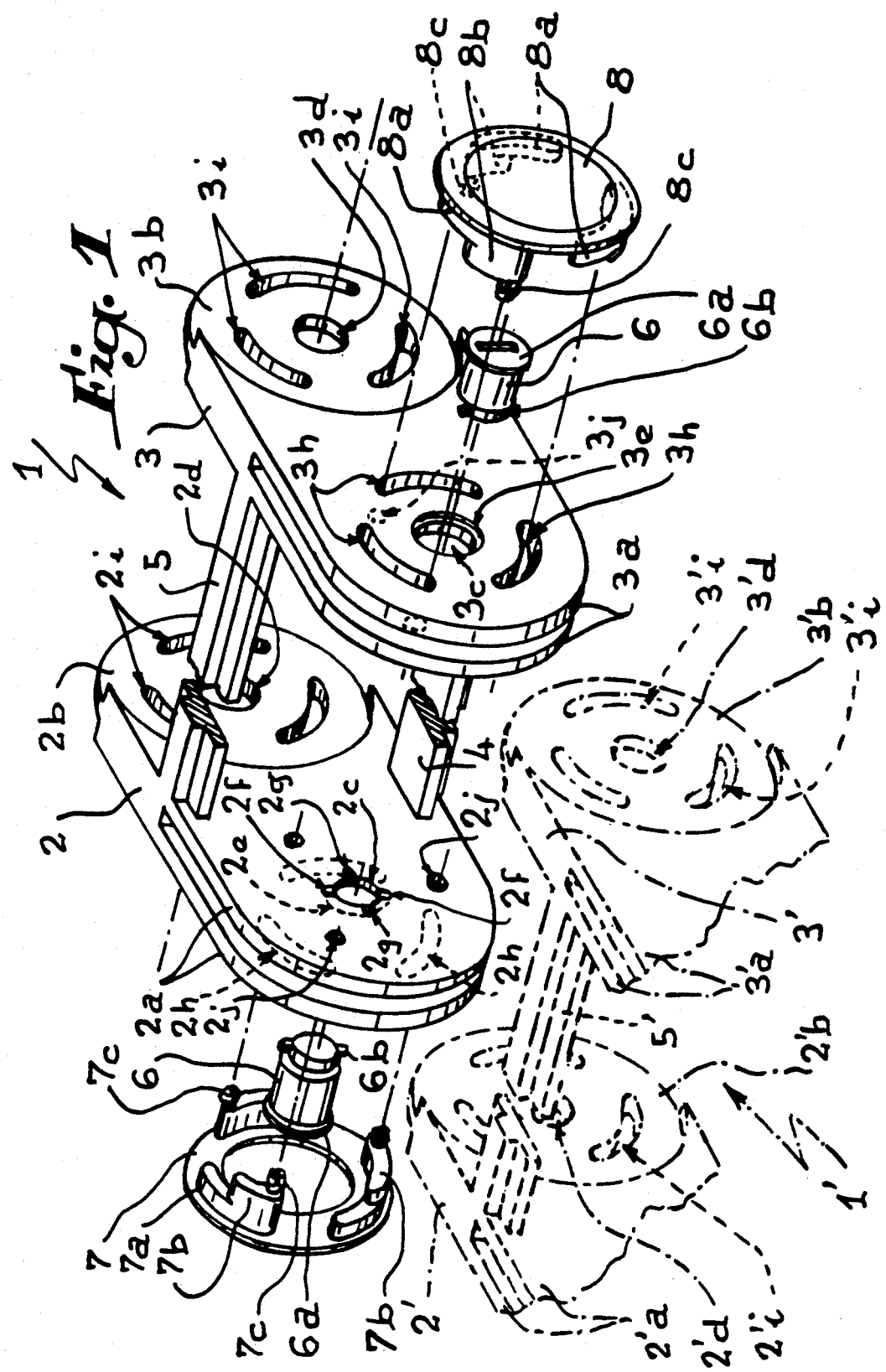

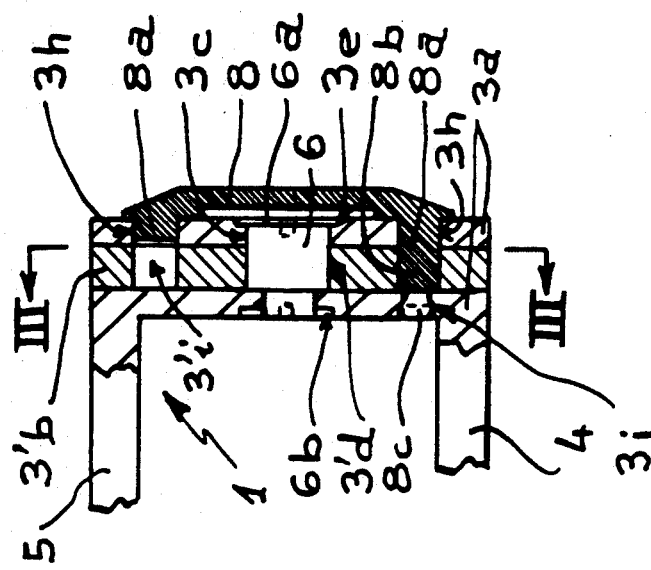
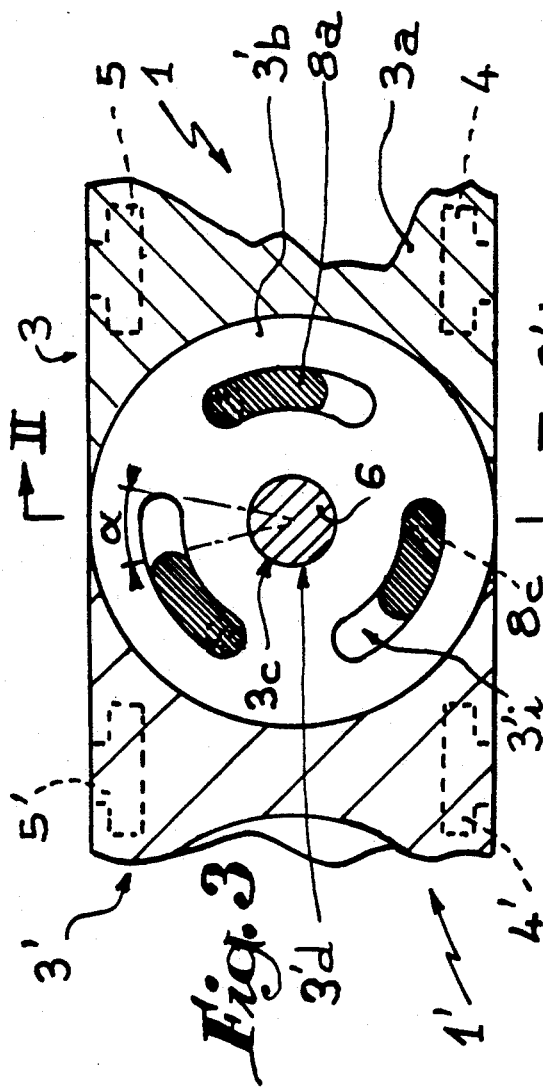
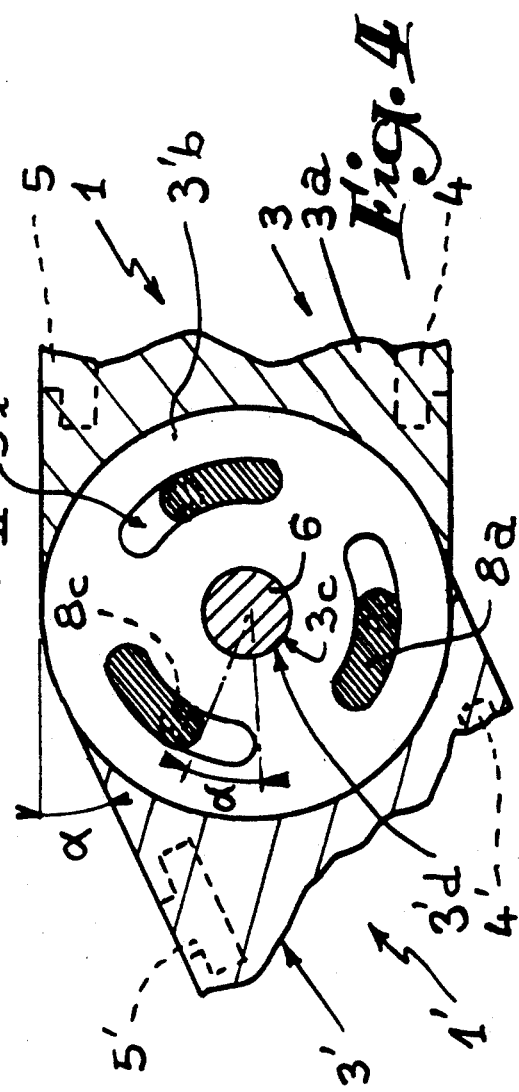

ARTICULATED SUPPORT FOR FLEXIBLE SUPPLY PIPES

BACKGROUND OF THE INVENTION

1. Field of the Invention

The present invention relates to articulated supports for flexible pipes conducting electrical current or pressurized fluid of assemblies such as manipulators, robots, manoeuvring arms and the like.

2. History of the Related Art

It is known that articulated supports of the type in question are formed by a chain of which the amplitude of rotation of the successive links must be limited as a function of the anticipated working angles.

In U.S. Pat. No. 4,590,961, there is described a support of this type in which each link includes two longitudinal side elements whose ends are sectioned to be pivotally assembled with the corresponding side elements of two adjacent links. The ends of the side elements are disposed side by side in overlapping relationship and are connected by a pin introduced in aligned openings provided in the ends. In fact, each pin is carried by an amplitude limiter device constituted by a removable plate which is disposed around the pin and which include relief portions which fit within slots of arcuate section made in the ends of the side elements.

Although such an arrangement makes it possible to modify the amplitude of the angular displacement of a links of the chain or support by replacement by plates having relief portions of different shapes, the results obtained are not entirely satisfactory. The removable plates are not pivotally retained on the side elements of the links, so that the displacement of the assembly of the chain is fairly imprecise. The support lacks rigidity and, furthermore, replacement of the plates necessarily involves the momentary disconnection of the links since the pivot and assembly pins are carried by the plates.

SUMMARY OF THE INVENTION

The present invention intends to overcome these drawbacks, and has for its object the articulated support which is defined in following claims

BRIEF DESCRIPTION OF THE DRAWINGS

The accompanying drawing, given by way of example, will enable the invention, the characteristics that it presents and the advantages that it is capable of procuring, to be more readily understood.

FIG. 1 is an exploded view in perspective of one of the links of an articulated support according to the invention. The discontinuous lines represent the ends of an adjacent link.

FIG. 2 is a partial transverse section of the articulation of two links taken along line II—II of FIG. 3.

FIG. 3 is a section along lines III—III of FIG. 2.

FIG. 4 is a view similar to that of FIG. 3, but illustrating the two links in an oblique position with respect to each other.

DESCRIPTION OF THE PREFERRED EMBODIMENT

Each link 1 of the articulated support includes as illustrated in FIG. 1, two identical side elements 2, 3 symmetrical with respect to the longitudinal median plane of the link 1. The two side elements are joined by crosspieces 4, 5 made either in one piece with the links or by independent tie-rods. It will be observed that one of the ends of each side element includes two spaced arcuate flanges 2a, 3a while the other end is made in the form of a tenon 2b, 3b whose thickness corresponds to the spacing between the flanges of the opposite end of each side element. In this way, another link 1' shown schematically in discontinuous lines, may be assembled on the link 1 by the penetration of the two tenons 2'b, 3'b between the flanges 2a, 3a of the link 1.

Each forked or flanged end of the side elements includes a central hole 2c, 3c intended to receive an independent pin 6 which also traverse holes 2d, 3d of the same diameter made in the tenons 2b, 3b. In this way, when the tenons are engaged between the flanges of another link, the two links are articulated with respect to each other in a pivoting manner about the pins 6. It will be observed that each hole 2c, 3c has two diameters, the openings 2e, 3e of larger diameter being made in the outer flange of each side element 2 and 3.

Each pin 6 includes at one of its ends a head 6a which is seated in the large-diameter opening 2e, 3e of each of the holes 2c, 3c. Its opposite end is reduced and includes a key 6b which traverses two notches 2f, 3f made in the inner flange of each forked end of the side elements 2 and 3. Two other diametrally opposite notches 2g, 3g receive the key after rotation of the pin 6 in the hole in which it is inserted.

It will be observed that the outer flanges as well as the tenons 2b, 3b include three arcuate slots 2h-2j, 3h-3j disposed concentrically to their respective holes. The slots are of the same length and are located at 180° with respect to one another. The orientation of the slots is the same at the two ends of each link.

In order to limit the amplitude of the angular pivotable displacement of the links, circular plates 7, 8 are employed, whose inner face includes three arcuate bosses 7a, 8a oriented in the same manner to that of the slots of each outer flange and of the tenon of the two side elements 2 and 3. The thickness of the bosses is equal to that of the outer flanges of the side elements, so that they fit exactly within the slots made therein. Each boss includes an outer shorter rib 7b, 8b which is engaged in each slot 2i, 3i, of the tenon of an adjacent link (FIGS. 2 and 3). Each of the ribs further includes a split head projection 7c, 8c which engages in one of the three holes 2j, 3j tapered made in the inner flanges of the forked ends of each link. In this way, each plate 7, 8 is held by being clipped to the corresponding side element of each link.

Functioning is as follows: As illustrated in FIG. 2, each plate 7, 8 is pivotally fixed with respect to the forked end of the corresponding side element of the link. The arcuate bosses 7a, 8a engage with little friction in the corresponding slots 2h, 3h of the outer flanges of the side elements 2 and 3, whilst the projections 7c, 8c of each plate 7, 8 clip in the corresponding holes, as described hereinabove. On the contrary, the ribs 7b, 8b of the plates 7, 8 do not occupy all the area of the slots 2i, 3i of the tenons of the adjacent link 1', with the result that, when the two links are in line with each other, the free space corresponds to an angle α. When the links pivot with respect to one another, their pivoting is limited by the value of the angle with the ends of the ribs of the plates coming into abutment against the ends of the slots, as illustrated in FIG. 4 concerning plate 8.

Of course, when the pivoting of the links with respect to one another must be different from α, it suffices to exchange the plates for others of which the length of the ribs is different.

An amplitude limiting device has thus been produced, which is very simple to produce since all its elements may be moulded from plastic materials, and whose functioning is very reliable. It will be observed that the articulated support is rigid due to the efficient connection of the plates 7, 8 and the links 1, 1'. The displacement of an assembly of the links of a support is precise which avoids any deforming of the flexible pipes supported by the chain.

We claim:

1. In an articulated chain for use in supporting flexible supply conduits wherein the chain includes adjacent links having two longitudinal side elements, the improvement comprising; each of said side elements having a first forked end having first and second parallel spaced flanges and a second tenon end, pin means pivotable connecting said forked end of one link to said second tenon end of an adjacent link so that first and second flanges are on opposite sides of said tenon end, at least one first arcuate slot in said first flange and one second arcuate slot in each of said tenon end of said adjacent link, said first and second slots terminating at opposite end walls and being in concentric relationship with respect to said pin means, at least one hole in said second flange of said one link, control plate means, said control plate means including an arcuate boss of a size to be seated within said at least one first arcuate slot in said first flange and in engagement with said opposite end walls, a rib extending from said boss and into said second slot in said tenon end of said adjacent link, said rib being of a size to permit relative pivoting motion between said tenon end of said adjacent link and said one link, and at least one protrusion means extending from said control plate means and engagable within said at least one hole in said second flange of said one link whereby the degree of pivoting motion between said adjacent and said one link is regulated by said rib within said second slot and said at least one protrusion means retains said control plate means relative to said forked end of said one link.

2. The articulated chain support of claim 1 in which said at least one protrusion means extends outwardly from said rib.

3. The articulated chain support of claim 2 including a plurality of first and second arcuate slots in said first flange of said one link and second tenon end of said adjacent link, said control plate means including a plurality of arcuate bosses, a rib extending from each of said bosses, a protrusion means extending from each of said ribs, and a plurality of holes in said second flange for receiving said protrusion means.

4. The articulated chain support of claim 3 in which said pins means is independently movable relative to said control plate means.

* * * * *